Nov. 3, 1925.
H. E. BRANDT
1,559,843
SPRAYER WITH AIR CHAMBER AND TRANSVERSE TANK
Filed July 17, 1924
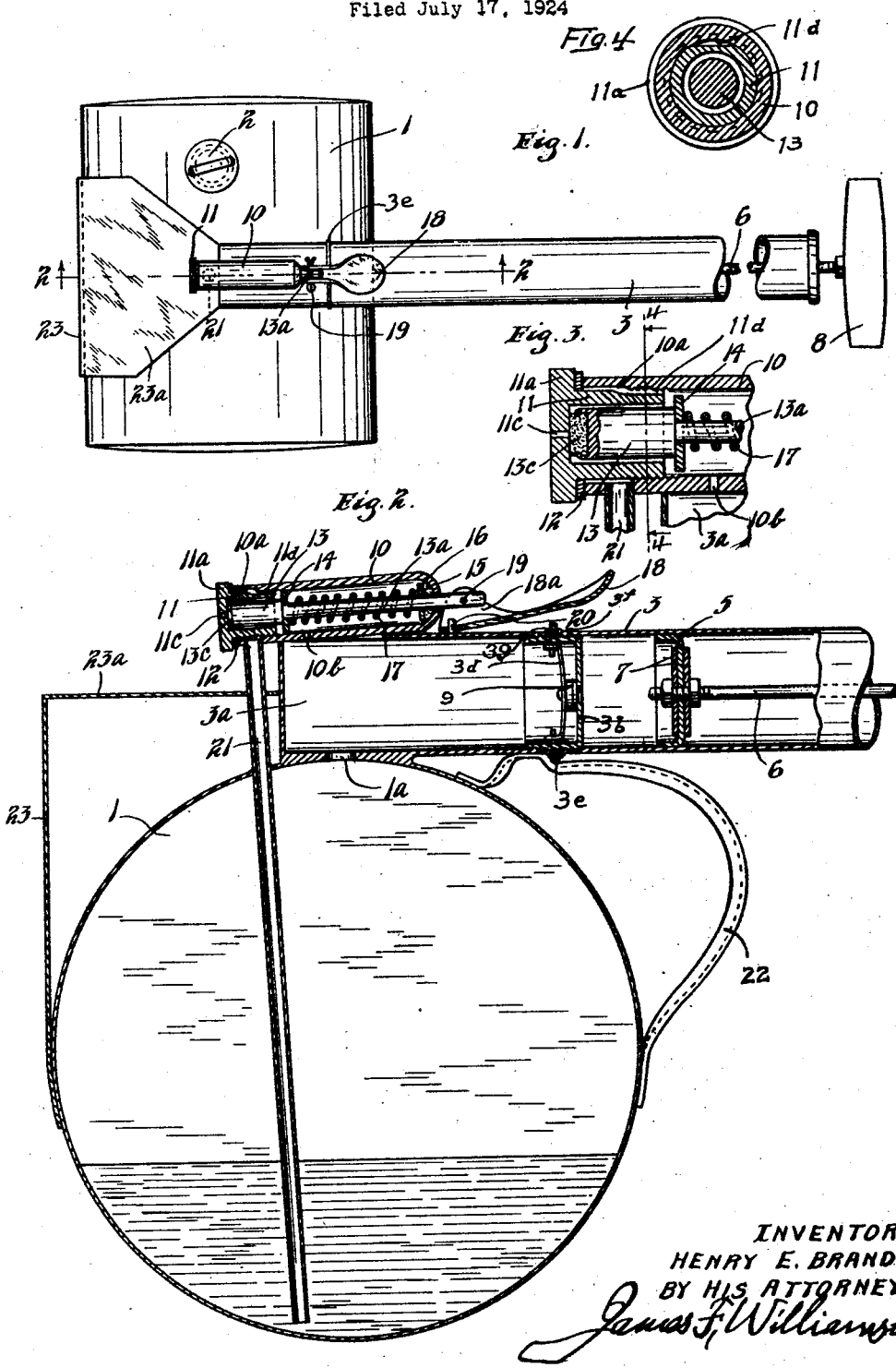
INVENTOR.
HENRY E. BRANDT.
BY HIS ATTORNEY.
James F. Williamson Patented Nov. 3, 1925.

1,559,843

UNITED STATES PATENT OFFICE.

HENRY E. BRANDT, OF NORTH ST. PAUL, MINNESOTA, ASSIGNOR TO DOBBINS MANUFACTURING COMPANY, OF NORTH ST. PAUL, MINNESOTA, A CORPORATION OF SOUTH DAKOTA.

SPRAYER WITH AIR CHAMBER AND TRANSVERSE TANK.

Application filed July 17, 1924. Serial No. 726,498.

*To all whom it may concern:*

Be it known that I, HENRY E. BRANDT, a citizen of the United States, residing at North St. Paul, in the county of Ramsey and State of Minnesota, have invented certain new and useful Improvements in Sprayers with Air Chambers and Transverse Tanks; and I do hereby declare the following to be a full, clear, and exact description of the invention, such as will enable others skilled in the art to which it appertains to make and use the same.

This invention relates to a spraying device adapted to spray various liquids, such as insecticides, and particularly to such a sprayer of the type carried in and operated by the hands.

It is an object of this invention to provide a simple and efficient spraying device comprising a cylindrical tank for containing liquid and an air pump having a barrel, which barrel is secured to the tank and extends substantially at right angles to the tank so that when the sprayer is laid down on a surface, it will remain in upright position.

It is a further object of the invention to provide such a sprayer comprising a liquid containing tank having an air pump connected thereto and a discharge nozzle carried by said pump, all of said parts being arranged in convenient relation.

It is still another object of the invention to provide such a sprayer having a simple and efficient discharge nozzle and controlling means therefor.

These and other objects and advantages of the invention will be fully set forth in the following description made in connection with the accompanying drawings in which like reference characters refer to the same parts throughout the different views, and in which, Fig. 1 is a top plan view of the device;

Fig. 2 is a vertical section taken on the line 2—2 of Fig. 1; shown on an enlarged scale;

Fig. 3 is a partial vertical section similar to Fig. 2 shown on an enlarged scale; and Fig. 4 is a vertical section on line 4—4 of Fig. 3.

Referring to the drawings, the device comprises a receptacle 1 of cylindrical form having closed ends and being provided on its upper side with a removable filling cap 2. An air pump is provided for the sprayer having a barrel 3 of cylindrical form, which barrel has a front portion $3^a$ arranged to form a compressed air chamber. The barrel is disposed substantially tangent to the tank 1 and is connected thereto with the axis of said barrel extending substantially at right angles to the axis of said tank. The barrel and tank will be connected by being soldered, brazed, or in any other manner. The barrel 3 has a cup-shaped nipple $3^b$ threaded into its end and tightly secured therein, the end of said nipple forming a partition extending across said barrel. Said end has a central aperture therein adapted to be closed by a valve 9 normally held against said end and carried by a narrow plate spring $3^d$. Said plate spring has slots in each of its ends engaging over lugs or tongues struck up from the sides of the nipple $3^b$, the ends of said strip being bent substantially at right angles. The open end of nipple $3^b$ projects beyond the end of the barrel 3 and is adapted to screw into the interiorly threaded end of the front portion $3^a$. Barrel 3 has an outwardly turned flange $3^f$ at its inner end and front portion $3^a$ has a similar outwardly turned flange $3^g$ at its outer end. A gasket washer $3^e$ is disposed between the flanges $3^f$ and $3^g$ of barrel 3 and the front portion $3^a$. The chamber in the front portion $3^a$ respectively of the barrel communicates with the tank 1 through an opening $1^a$. The main portion of barrel 3 with nipple $3^b$ can thus be detached from portion $3^a$, to afford ready access to valve 9. A plunger 5 reciprocates in barrel 3 being held on the plunger rod 6 by nuts threaded on the end of said rod and engaging, respectively, washers 7 at each side of said plunger. The said rod 6 extends through the outer closed end of barrel 3 and is provided with an operating handle 8.

A nozzle member is provided comprising a cylindrical barrel 10 having its inner end provided with a central aperture. Said barrel has an open outer end and is provided with a portion having a bore of increased diameter adjacent said open end and is interiorly threaded adjacent said portion. Said barrel has a small opening $10^b$ communicating with chamber $3^a$. A cap member 11 having a flanged and closed end $11^a$ is threaded into the barrel 10 and said cap forms an annular chamber 10ª with the portion of the barrel 10 having the increased bore, a gasket 12 being disposed between the front end of the barrel 10 and the flange 11ª. The cap 11 formed as a hollow cylindrical member is provided with a small central aperture 11ᶜ through its forward end forming a discharge aperture. Cap 11 also has a flattened or grooved portion 11ᵈ at one side of its threaded exterior adapted to form a passage leading to annular chamber 10ª. A plunger member 13 has its forward end disposed in the cap 11 and the front end of said plunger forms a valve cooperating with the aperture 11ᶜ. The front end of said plunger is recessed to receive a piece of leather or other yielding material 13ᶜ and the edge of said recess is spun over on said member 13ᶜ to hold it in place. Said plunger 13 has its rear portion of reduced diameter and a washer 14 surrounds the front end of said portion 13ª and abuts against the shoulder formed between said rear portion and the front end of said plunger. The portion 13ª projects rearwardly through the aperture in the rear of the barrel 10 and a packing member 15 surrounds said portion of the plunger and abuts the rear end of said barrel, a washer 16 contacting said packing member. A compression coiled spring 17 surrounds the portion 13ª of the plunger and presses against washer 15 and washer 14, said spring normally holding the plunger in forward position to close the aperture 11ᶜ.

A finger operated lever 18 has an oblong upwardly curved outer end and has upwardly extending substantially parallel ears 18ª at its forward end. Said ears are apertured to receive a pivot member which may be in the form of a cotter pin 19 extending through said ears and an aperture in the outer end of portion 13ª of the plunger. Said lever 18 has an aperture in its lower portion adjacent its front end which embraces a pin 20 projecting upwardly from and secured to the top of barrel 3. A tube 21 is secured in the front portion of the barrel 10 and communicates with the annular chamber 10ª and extends downwardly through the tank 1 to a point adjacent the bottom thereof.

A curved handle 22 is connected at one end to the interior side of tank 1 and extends upwardly and outwardly therefrom in curved form and engaging with its outer flanged end, said handle then curving downwardly and being secured at its other end to the upper portion of tank 1. Said handle is formed of a strip of material having its side edges curved substantially at right angles. Said handle forms a convenient grip for holding the sprayer while operating the plunger 6 and also affords a brace and reinforcing means for the barrel. Another strip of material 23 extends upwardly from the front end of tank 1 substantially tangential thereto and is then bent rearwardly at a right angle and secured to the front of barrel portion 3ª.

In operation, the liquid to be sprayed is placed in the tank 1. The air pump is then operated by grasping handle 22, and reciprocating rod 6 and handle 8. The air pump is provided with the usual valves and air is pumped by the plunger 5 into the chamber 3ª. Check valve 9 permits this air to enter said chamber but prevents the escape of said air. Air pressure is thus built up in chamber 3ª and in the tank 1 on top of the liquid therein. This air pressure will, of course, extend into the barrel 10 and the cap 11 but no liquid or air can escape from said barrel or nozzle owing to the fact that aperture 11ᶜ is closed by valve member 13ᶜ. When the desired pressure has been created and it is desired to spray the liquid, the operator presses on the outer end of lever 18 and withdraws the plunger valve 13 from the aperture 11ᶜ. The liquid in tank 1 is now forced upwardly through the tube 21 into the annular chamber 10ª and passes rearwardly through the passage formed by portion 11ᵈ in cap 11 and then passes around the end of cap 11 into the interior thereof around plunger 13. Air rushes outwardly into cap 11 around the end of plunger 13 and the liquid is forcibly sprayed outwardly through the aperture 11ᶜ. The liquid passing around the inner end of cap 11 is thus efficiently brought into the path of the air. The spraying will continue as long as there is pressure in the tank 1 and as long as the lever 18 is held in depressed position. As soon as lever 18 is released spring 17 moves plunger 13 and the aperture 11ᶜ is again closed by valve 13ᶜ and the discharge of liquid will cease. It is sometimes desirable to place the device on end and to pump up pressure by handle 8 with rod 6 extending substantially vertically. The members 23 and 23ª form a firm and convenient support for this operation, and eliminate the strain which would otherwise be placed on the point of connection of barrel 3 and tank 1. The device will readily stand erect supported on member 23 and tank 1.

From the above description it is seen that applicant has provided a very simple and efficient spraying device. It will be noted that, owing to the fact that the barrel 5 extends at right angles to the tank 1, that when the sprayer is laid down, the same will remain in upright position. In sprayers of the prior art having a pump barrel and air chamber thereon, said barrel was placed with its axis parallel to the axis of the tank so that when the sprayer was laid down it would roll over on the tank until the pump barrel or valve part struck the supporting surface. The barrel 3 is conveniently secured to the tank 1 and the nozzle is conveniently secured to the top of the barrel 3 by soldering, or otherwise, so that the parts are all held in convenient and rigid relation. The structure of the nozzle and operating means is quite simple. All of the parts can be easily and inexpensively made and when assembled the sprayer works very efficiently and involves no trouble for maintenance. The sprayer has been amply demonstrated in actual practice and found to be very successful and efficient. The same is being commercially made and sold and is meeting with much success.

It will, of course, be understood, that various changes may be made in the form, details, arrangement and proportions of the parts without departing from the scope of applicant's invention, which, generally stated, consists in a device capable of carrying out the objects above set forth, such as shown and described and defined in the appended claims.

What is claimed is:

1. A liquid spraying device forming a rigid unit having in combination, a liquid containing tank, an air pump comprising a barrel rigidly secured to the top of said tank, said barrel having a compressed air chamber in its front portion, a hollow cylindrical member secured to and extending longitudinally of said barrel at its top and front end and having an opening communicating with said air chamber, said member having an annular recess in its forward end, a tube communicating with said recess and extending to the bottom of said tank, a closing member fitting into the outer end of said member and having a hollow interior and a central discharge aperture therethrough, said closing member forming with said recess an annular chamber and having an exterior channel forming with said member a passage leading from said annular chamber to the interior of said closed member, a plunger extending through said cylindrical member and extending into the interior of said closing member, the front end of said plunger forming a valve cooperating with said discharge aperture, means for holding said plunger in position to close said discharge aperture and means for moving the same to open said discharge aperture.

2. A liquid spraying device forming a rigid unit having in combination, means for containing liquid to be sprayed, means for forcing liquid through a nozzle supply tube, a nozzle comprising a cylindrical barrel, apertured at one end and having its other end open, said barrel having a portion of increased diameter of bore adjacent its open end and having adjacent said portion, a flanged open ended cap having a sleeve disposed in said barrel engaging said threads and closing the end of said barrel, said portion of increased diameter of bore forming with said sleeve an annular chamber extending about said sleeve with which chamber said nozzle supply tube communicates, said sleeve having an exterior cutaway portion forming a passage between said chamber and the interior of said sleeve, said cap having a small central discharge aperture in its front end, a plunger valve co-operating with said aperture in said cap and extending through the apertured end of said barrel, a spring pressing said plunger valve to closed position, and means for withdrawing said plunger valve and opening said aperture in said cap to permit the discharge of liquid.

3. A liquid spraying device having in combination, a liquid containing tank, an air pump comprising a barrel secured to the top of said tank and extending substantially at right angles to the axis of said tank, said barrel having a forward portion forming a compressed air chamber, a spraying nozzle secured on top of and extending longitudinally of said barrel at the front end thereof, means for controlling the discharge of liquid through said nozzle, and a supporting foot extending substantially tangent to the front of said tank and connected to the end of said barrel.

4. A sprayer device comprising a tank and a barrel section secured thereto, said section having removably secured therein a cylindrical member with a closed end, said end having an aperture therein and said member carrying a spring-pressed check valve normally closing said aperture, said check valve opening inwardly of said barrel section, said member projecting from said section and having tightly secured on its exterior a second barrel section, and a gasket ring surrounding said cylindrical member and engaged by the adjacent ends of said barrel section.

5. A liquid spraying device having in combination, a liquid supply receptacle, means for placing liquid therein under pressure, a nozzle comprising a cylindrical barrel, a cylindrical hollow member having an open rear end fitting in the end of said cylindrical barrel closing the end thereof and provided with a small discharge aperture in its forward portion, said cylindrical barrel and said member being spaced to provide an annular chamber communicating with said liquid in said receptacle, said cylindrical hollow member having a flat exterior portion forming with said barrel a passage leading from said annular chamber to its rear end and interior and means for supplying air under pressure to said cylindrical barrel whereby the liquid from said receptacle is forced into said annular chamber through said passage around the end of and into said cylindrical hollow member and is forced out through said discharge aperture and sprayed by said air under pressure.

6. A spraying device comprising a tank, a barrel member of relative small diameter rigidly secured to the top of said tank, said barrel having a front section interiorly threaded at its rear end, a cup-shaped sleeve screwed therein forming a partition in said barrel and carrying a forwardly opening check valve, said sleeve being exteriorly threaded and projecting at the rear end of said section, a rear section of said barrel screwed onto said sleeve and a gasket surrounding said sleeve and clamped between said sections.

7. The structure set forth in claim 6, said sections having out-turned flanges thereon at their adjacent ends between which said gasket is disposed.

In testimony whereof I affix my signature.

HENRY E. BRANDT.